United States Patent [19]

Su

[11] 4,135,012
[45] Jan. 16, 1979

[54] SURFACE TREATMENT OF ZIRCONIA CERAMIC

[75] Inventor: Yao-Sin Su, Corning, N.Y.

[73] Assignee: Corning Glass Works, Corning, N.Y.

[21] Appl. No.: 790,432

[22] Filed: Apr. 25, 1977

[51] Int. Cl.² .................... B05D 3/04; B05D 3/10
[52] U.S. Cl. ............................. 427/309; 156/638; 156/667; 427/444
[58] Field of Search ............ 427/309, 307, 304, 275, 427/444, 430; 156/663, 638, 667; 252/79.2, 79.5; 65/31; 106/57

[56] References Cited

U.S. PATENT DOCUMENTS

| | | | |
|---|---|---|---|
| 2,401,537 | 6/1946 | Adams | 427/309 |
| 2,872,312 | 2/1959 | Eisenberg | 427/377 |
| 3,078,180 | 2/1963 | Zander et al. | 427/309 |
| 3,113,855 | 12/1963 | Elmer | 65/31 |
| 3,116,991 | 1/1964 | Le Clerc et al. | 65/31 |
| 3,287,143 | 11/1966 | Yavorsky | 106/57 |
| 3,296,012 | 1/1967 | Stalnecker | 427/123 |
| 3,296,012 | 1/1967 | Stalnecker | 427/309 |
| 3,365,317 | 1/1968 | Yavorsky | 106/57 |
| 3,433,680 | 3/1969 | Archer et al. | 427/115 |
| 3,690,921 | 9/1972 | Elmore | 427/299 |
| 3,881,944 | 5/1975 | Beall | 65/31 |

FOREIGN PATENT DOCUMENTS 1302486  7/1962  France ..................... 65/31

Primary Examiner—Ronald H. Smith
Assistant Examiner—Sadie L. Childs
Attorney, Agent, or Firm—Richard N. Wardell; Clarence R. Patty, Jr.

[57] ABSTRACT

Smooth surfaces of impervious zirconia-base ceramics are chemically treated to produce micropitting and/or microcratering therein which enables durable adherence of metal coatings (e.g. of noble metal) applied thereon. Treatment involves contact of the smooth surfaces with liquid leachant selected from concentrated sulfuric acid, ammonium bisulfate, alkali metal bisulfate and mixtures thereof at a temperature of at least 250° C. Leached surface is contacted with hydrochloric acid to remove reaction residue comprising sulfate of metal elements including zirconium in the ceramic.

17 Claims, 3 Drawing Figures

1

SURFACE TREATMENT OF ZIRCONIA CERAMIC

BACKGROUND OF THE INVENTION

Metal coatings are applied onto surfaces of ceramic bodies for a variety of purposes and in a variety of ways. Generally in all such cases, firm adherence of the coatings often is made possible by a multitude of very small depressions or indentations or pores in such surfaces. Integral parts of the coatings extend into the depressions usually to effect strong durable mechanical keying or bonding of the coatings to the surface. These depressions or indentations may be either substantial customary porosity of the bodies opening onto the surfaces thereof to be coated or the result of roughening the surfaces to be coated by grit blasting or by chemical treatment like etching or leaching (of U.S. Pat. Nos. 2,195,436, 2,872,312, 3,083,109, 3,136,658, 3,296,012, 3,598,635, 3,690,921 and 3,941, 673). Concerning specific chemical treatments:

U.S. Pat. No. 2,195,436 suggests including sodium fluoride in a coating solution of a thermally decomposable metal compound applied to a ceramic so that the fluoride preliminarily reacts with and roughens the surface of the ceramic such as glass, porcelain, fused silica and alundum (alumina).

U.S. Pat. No. 2,872,312 recites the use of a sulphurichydrofluoric acid solution to roughen by etching the surface of a ceramic, e.g. aluminum oxide, so as to form minute surface irregularities or pores thereon.

U.S. Pat. No. 3,296,012 describes the provision of a submicroscopically porous surface on a ceramic by leaching with a suitable boiling acid, such as orthophosphoric acid for alumina and hydrofluoric acid for zircon, beryllia, steatite and silicate glass-ceramics.

U.S. Pat. No. 3,690,921 discloses molten alkali metal hydroxides as etchant for altering the surface of ceramics such as alumina, zircon, beryllia, steatite and silicate glass-ceramics.

For the purpose of degreasing calcia- or yttria-stabilized zirconia (but apparently not roughening it) so that a platinum coating will more readily adhere thereto, U.S. Pat. No. 3,433,680 mentions washing that ceramic with an organic solvent and/or aqua regia.

In attempts to roughen the smooth surfaces of impervious zirconia-base ceramics to facilitate firm adherence of metal coatings thereon, none of the reactants, etchants, leachants or acid degreaser disclosed in the prior art noted above were found to roughen those surfaces so as to effect such firm adherence. While grit blasting of the zirconia-base ceramics did roughen their surfaces to facilitate adherence of metal coating, those blasted ceramics were so mechanically weakened that they broke up when subjected to elevated temperature service conditions. These zirconia-base ceramics contain more than 50 wt. % $ZrO_2$. Many include one or more of the stabilizer oxides of magnesium, calcium, yttrium, rare earth metal, etc., which yield partially or wholly stabilized zirconia (i.e. partially or wholly composed of thermally stable cubic and/or tetragonal crystal phase), depending upon the amount of stabilizer oxide and firing temperature as is known. These impervious or gastight zirconia-base ceramics with smooth surfaces are fabricated from fine grained particulate raw material that is molded into shaped bodies which are fired to develop well sintered structures, e.g. as illustrated in U.S. Pat. Nos. 3,287,143 and 3,365,317.

SUMMARY OF THE INVENTION

I have discovered a method of chemically treating smooth-surfaced, impervious, zirconia-base ceramics so that their treated surfaces exhibit micropitting and/or microcratering generally uniformly or homogeneously distributed throughout the microstructures thereof. While they commonly vary in size and shape on each surface, the dimensions across individual mircopits and microcraters are generally in the respective ranges of about 0.5–25 μm and 10–100 μm. This discovery overcomes the twin problems of: (a) metal coatings applied onto the clean smooth surfaces of the impervious zirconia-base ceramics being easily removable therefrom even by hand-rubbing, peeling or scraping, and (b) there being no previously known suitable chemical treatment of smooth surfaces of impervious zirconia-base ceramics to produce roughening or depressions thereof whereby integral parts of metal coatings applied thereto extend into such depressions to effect strong durable keying or bonding of the coatings to those surfaces.

The method of my invention comprises at least five basic steps. First, the smooth surface of an impervious zirconia-base ceramic, which is to be treated, is contacted with a liquid leachant selected from concentrated sulfuric acid, ammonium bisulfate, alkali metal bisulfate and mixtures thereof at a temperature of at least about 250° C. (up to the boiling point thereof) and for a time sufficient to effect the micropitting and/or microcratering (of size as described above) generally uniformly distributed throughout the microstructure of the resultant leached surface. Second, the leached surface is removed from contact with the leachant. Third, the leached surface is contacted with hydrochloric acid to effect removal from that surface of a residue thereon comprising sulfate of metal elements including zirconium in the ceramic. Fourth, the leached surface (free of sulfate residue) is removed from contact with the hydrochloric acid. Fifth, the leached surface is rinsed with water to effect removal of acid residue from that surface.

My method invention can also be specifically considered as a method of improving adherence of a metal coating on an initially smooth surface of an impervious zirconia-base ceramic. Such method comprises the five basic steps described above plus a sixth basic step of forming a metal coating on the rinsed leached surface, with the metal of the coating extending into the micropitting and/or microcratering of that surface. This sixth step can be carried out by any suitable technique, e.g. those known heretofore, including thermally decomposing applied chloroplatinic acid or metal resinate, firing an applied metal powder paste, sputtering of a metal, flame spraying a metal, etc.

Figure 1A:
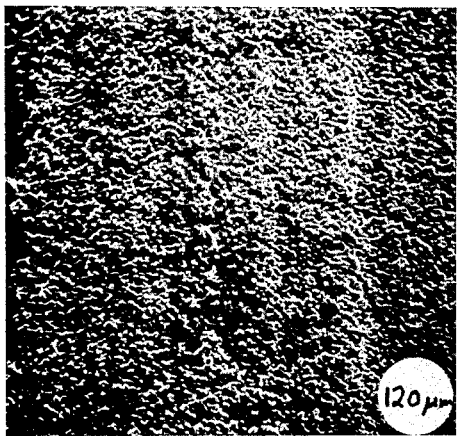
FIGS. 1a–d are photomicrographs of the surfaces of an impervious stabilized zirconia containing 8 wt.% (4.5 mole %) yttria and which surfaces are in various conditions: (a) smooth as-fabricated, (b) after contact by aqua regia at 100° C. for two hours, (c) after contact by concentrated sulfuric acid at 300° C. for two hours, and (d) after contact by molten ammonium bisulfate at approximately 300° C. for fifteen minutes.

All of thee photomicrographs are of approximately 150X magnification obtained by scanning electron microscopy. (SEM).

PREFERRED EMBODIMENTS

A series of slip cast, impervious, stabilized zirconia tubes (¾ inch long, ¼ inch outside diameter and 3/16 inch inside diameter) of three different compositions were selected for comparative surface examination in the as-fabricated condition and after various chemical treatments, including those according to the invention claimed herein. The stabilizer oxides and amounts thereof in each of those compositions (with the balances being $ZrO_2$ plus ordinary incidental impurities, the latter usually being less than 2 wt.%) are set forth in Table 1.

TABLE I

| Composition | Stabilizer Oxide | Wt. % | Mole % |
|---|---|---|---|
| 1372A | $Y_2O_3$ | 8 | 4.5 |
| 0921 | CaO | 7.5 | 15 |

TABLE I-continued

| Composition | Stabilizer Oxide | Wt. % | Mole % |
|---|---|---|---|
| 1027 | MgO | 3 | 8.6 |

The tubes for chemical treatment were immersed in the leachants at the temperatures and for the times set forth in Table 2 (wherein each tube is identified by its stabilizer oxide). Upon removal from the leachants, the tubes were allowed to cool in air to about room temperature to avoid thermal shock damage, then rinsed in a stream of lukewarm water to remove acid residue, and next immersed in a boiling (110° C.) 50% aqueous HCl wash solution (6N HCl) for one hour to effect cleaning of the tubes and removal (dissolving) of residues left on the tubes by the leachant treatments. For example, this HCl washing step enables removal of the white residues left on the tubes by leachants according to the sulfates of zirconium and of the metals forming the stabilizer oxides with the ratios of those metals in the sulfate residue being in about the same ratio as they were in the tube compositions (thereby indicating lack of preferential leaching of either $ZrO_2$ or the stabilizer oxides). Next, the tubes were initially rinsed in a stream of lukewarm water and then given a soaking rinse in hot water at about 80° C. for one hour to assure complete removal of the acid. After drying the rinsed tubes in an oven at 120°–140° C. for about 1–2 hours, their treated surfaces were examined and compared along with surfaces of untreated, as-fabricated tubes by ordinary optical macroscopy (50X magnification) and by SEM.

TABLE 2

| Stab. Oxide | Leachant | Temp. °C (1) | Time hrs. | Appearance Under Ordinary Optical Microscopy | SEM FIG. | % Wt. Loss |
|---|---|---|---|---|---|---|
| $Y_2O_3$ | Aqua Regia (3:1) 12M HCL:16M $HNO_3$ | 100 | 2.0 | | 1b | — |
| $Y_2O_3$ | 16M $HNO_3$ (conc.) | 100 | 6.0 | | — | — |
| $Y_2O_3$ | 12M HCl (conc.) | 95 | 1.0 | | — | — |
| | | 95 | 2.0 | Similar to as-fabricated. | — | — |
| | | 95 | 6.0 | | — | — |
| | | | | Little noticeable change in | | |
| $Y_2O_3$ | 15M $H_3PO_4$ (conc.) | 155 | 3.0 | roughness. | — | — |
| $Y_2O_3$ | 6M $HClO_4$ (50% aqueous soln.) | 115 | 4.0 | No micropitting or microcratering. | — | — |
| $Y_2O_3$ | 19M NaOH (50% aqueous soln.) | B.P. | 0.25 | | — | — |
| $Y_2O_3$ | 9M $H_2SO_4$ (50% aqueous soln.) | 100 | 2.0 | | — | — |
| | | 100 | 4.0 | | — | — |
| | | 150 | 2.0 | | — | — |
| | | 150 | 4.0 | | — | — |
| $Y_2O_3$ | 18M $H_2SO_4$ (conc.) | 200 | 1.0 | Similar to as-fabricated. | — | — |
| | | 200 | 2.0 | | — | — |
| | | 200 | 6.0 | Little noticeable change in | — | — |
| | | 250 | 0.167 | roughness. | — | — |
| | | 250 | 0.333 | | — | — |
| | | 250 | 0.5 | No micropitting or microcratering. | — | 0.8 |
| $Y_2O_3$ | 7.25M HF + 4.5M $H_2SO_4$ | 100 | 1.8 | Polished smoother than as-fabricated. | — | — |
| $Y_2O_3$ | $NH_4F$ (molten) | 150 | 0.167 | | — | — |
| $Y_2O_3$ | NaF (molten) | 1100 (4) | 0.167 | | — | (3) |
| $Y_2O_3$ | 29M HF (conc.) | B.P. | 0.25 | | — | (3) |
| | | B.P. | 2.0 (2) | Some general roughening. | — | — |
| $Y_2O_3$ | 14.5M HF + 6M $HClO_4$ | 80 | 2.0 | No micropitting nor microcratering. | — | — |
| CaO | Aqua regia (as above) | 100 | 3.0 | Slight to moderate general roughening. | 2b | — |
| CaO | 12M HCl (conc.) | 95 | 6.0 | Slight tendency of microcratering. | — | — |
| MgO | Aqua regia (as above) | 100 | 3.0 | | 3b | — |
| MgO | 12M HCl (conc.) | 95 | 6.0 | | — | — |
| $Y_2O_3$ | 18M $H_2SO_4$ (conc.) | 200 | 51 | Moderate general roughening. No significant micropitting or microcratering. | — | — |
| $Y_2O_3$ | 18M $H_2SO_4$ (conc.) | 250 | 1.0 | | — | 2.0 |
| $Y_2O_3$ | $NH_4HSO_4$ (molten) | 300 (4) | 0.033 | Slightly micropitted | | 0.3 |
| $Y_2O_3$ | $NaHSO_4$ (molten) | 550 (4) | 0.033 | | | 2.7 |
| $Y_2O_3$ | 18M $H_2SO_4$ (conc.) | 250 | 2.0 | | — | 3.8 |
| | | | | Micropitted. | | |
| $Y_2O_3$ | $NH_4HSO_4$ (molten) | 300 (4) | 0.083 | | — | 3.1 |

TABLE 2-continued

| Stab. Oxide | Leachant | Temp. °C (1) | Time hrs. | Appearance Under Ordinary Optical Microscopy | SEM FIG. | % Wt. Loss |
|---|---|---|---|---|---|---|
| $Y_2O_3$ | 18M $H_2SO_4$ (conc.) | 250 | 3.5 | | — | 8.8 |
| | | | | Well micropitted. | | |
| $Y_2O_3$ | $NH_4HSO_4$ (molten) | 300 (4) | 0.25 | Roughness felt by finger. | 1d | 6.8 |
| $Y_2O_3$ | $NaHSO_4$ (molten) | 550 (4) | 0.083 | | — | 17 |
| | | 550 (4) | 0.25 | | — | — |
| $Y_2O_3$ | $NaHSO_4$ (molten) | 550 (4) | 0.5 | Very well micropitted. Rough surface noticeable by eyes. | — | 39 |
| $Y_2O_3$ | 18M $H_2SO_4$ (conc.) | 300 | 0.5 | | — | 5.6 |
| | | 300 | 1.0 | Microcratered. | — | 14 |
| | | 300 | 2.0 | | 1c | 30 |
| CaO | 18M $H_2SO_4$ (conc.) | 300 | 2.0 | | 2c | — |
| MgO | 18M $H_2SO_4$ (conc.) | 300 | 2.0 | | 3c | — |
| $Y_2O_3$ | 18M $H_2SO_4$ (conc.) | 300 | 3.5 | Well microcratered. | — | 39 |
| $Y_2O_3$ | 95 wt. % 18M $H_2SO_4$ + 5 wt. % $Na_2SO_4$ (5) | 315 | 3.5 | Roughness felt by finger | — | 39 |

Figure 1B:
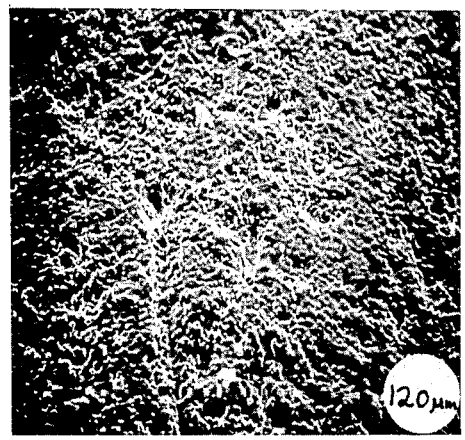
Figure 1C:
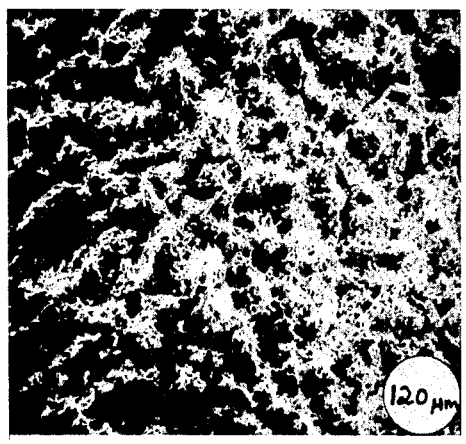
Figure 1D:
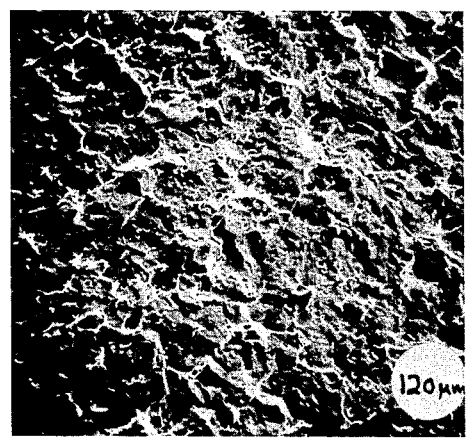
Figure 2A:
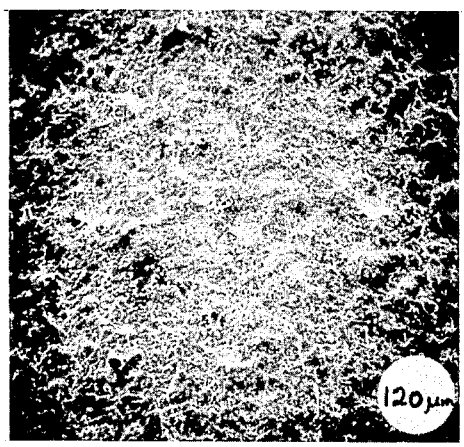
FIGS. 2a–c are photomicrographs of the surfaces of an impervious stabilized zirconia containing 7.5 wt.% (15 mole %) calcia and which surfaces are in various conditions: (a) smooth as-fabricated, (b) after contact by aqua regia at 100° C. for three hours and (c) after contact by concentrated sulfuric acid at 300° C. for two hours.
Figure 2B:
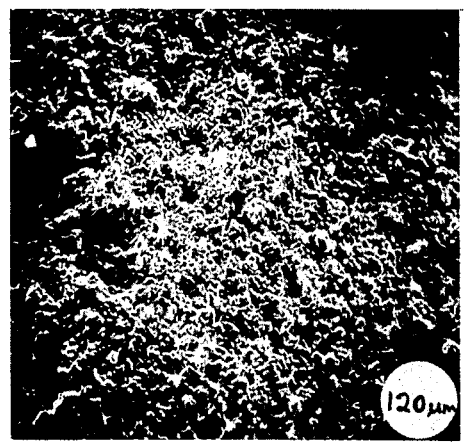
Figure 2C:
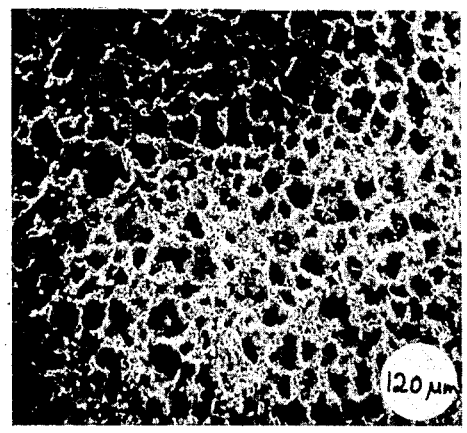
Figure 3A:
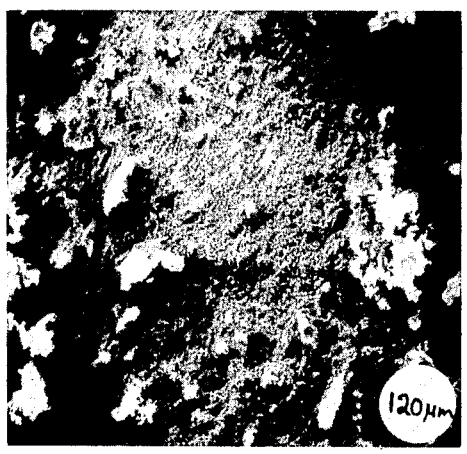
FIGS. 3a–c are photomicrographs of the surfaces of an impervious stabilized zirconia containing 3 wt.% (8.6 mole %) magnesia and which surfaces are in various conditions: (a) smooth as-fabricated, (b) after contact by aqua regia at 100° C. for three hours and (c) after contact by concentrated sulfuric acid at 300° C. for two hours.
Figure 3B:
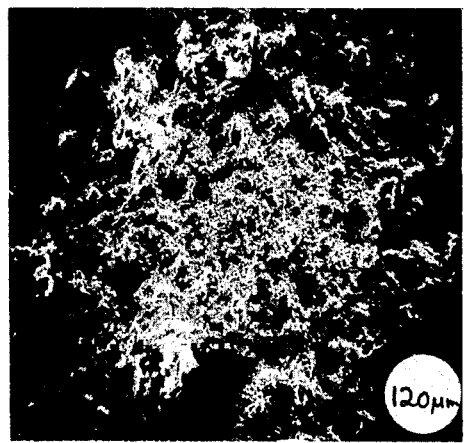
Figure 3C:
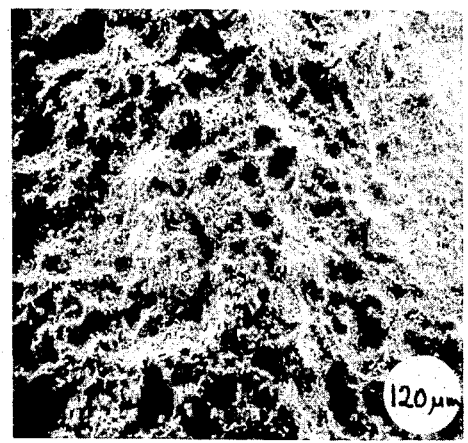

(1) B.P. indicates boiling point; all other temperatures are ±5° C., except as otherwise noted.
(2) Treatment broke tube into pieces with white $ZrF_4$ residue thereon.
(3) Substantial weight loss although amount not measured.
(4) ±50° C.
(5) Equivalent to 8.5 wt. % $NaHSO_4$ + 91.5 wt. % $H_2SO_4$ The appearances under optical microscopy of treated surfaces vis a vis as-fabricated surfaces, as noted in Table 2, indicate significant microcratering and/or micropitting having been obtained only with leachants consisting of concentrated sulfuric acid, ammonium bisulfate, alkali metal bisulfate and mixtures thereof. The cross-referenced SEM photomicrographs in the FIGURES show typical microstructures of surfaces with uniformly distributed microcratering (FIGS. 1c, 2c and 3c) or micropitting (FIG. 1d) in contrast to typical microstructures of treated surfaces with little to moderate general roughening, but without significant microcratering or micropitting (FIGS. 1b, 2b and 3b) and in further contrast to microstructures of as-fabricated surfaces (FIGS. 1a, 2a and 3a).

Significant weight losses that resulted from the chemical treatments of the tubes are also shown in Table 2.

To evaluate the significance of the microcratering and/or micropitting on adherence of metal coatings applied to surfaces of the impervious stabilized zirconia tubes of the three compositions previously described, untreated (as-fabricated) and treated tubes were prepared for forming metal coatings thereon by three different techniques. The chemical treatments of the treated tubes were as previously described, with the particular leachants, temperatures and times being as noted in Table 3. While other metal coatings are similarly suitable, platinum was chosen for the illustrative coatings because of the interest in applying it to stabilized zirconia for producing oxygen sensors. The three coating techniques utilized were: (a) applying platinum resinate liquid coating containing 12 wt.% Pt to tube surfaces and firing them in air atmosphere at about 900° C. to decompose the resinate into platinum metal coatings; (b) dipping tubes in chloroplatinic acid solution (10–25% $H_2PtCl_6$), thereafter firing in 8% $H_2$/92% $N_2$ forming gas atmosphere at about 650° C., and then repeating the dipping/firing cycle about 5–6 more times; and (c) flame spraying Pt (from wire) onto the tubes as a coating thereon. The adherence of these platinum coatings to the various tube surfaces was tested by hand scraping of the platinum coatings with a knife blade to determine the relative ease with which they could be scraped or peeled off the tube surfaces to leave those surfaces bare or exposed. The results of these tests are set forth in Table 3, which show that only those tubes treated in accordance with this invention (and having the microcratered and/or micropitted underlying surfaces) provided firm adherence of the metal coatings.

TABLE 3

Stabilized Zirconia Tubes

| Condition | Composition | Adherence Test Results |
|---|---|---|
| Untreated | 1372A 0921 1027 | Pt coatings scraped off easily, and Pt coating formed from resinate was removed even by finger rubbing. |
| Treated with aqua regia at 100° C for 2–3 hours | 1372A 0921 1027 | Pt coatings scraped off relatively easily. |
| Treated with conc. $H_2SO_4$ at 300° C for 1–3 hours | 1372A 0921 1027 | Pt coatings could not be removed by scraping |
| Treated with conc. $H_2SO_4$ at 250° C for 2 hours | 1372A | Pt coatings could not be removed by scraping |
| Treated with molten $NH_4HSO_4$ at ~300° C for 15 minutes | 1372A | Pt coatings could not be removed by scraping |
| Treated with molten $NaHSO_4$ at ~550° C for 15 minutes | 1372A | Pt coatings could not be removed by scraping |

For the production of oxygen sensors, it is preferred to employ slip cast tubes of impervious stabilized zirconia with one rounded closed end and one open end. To facilitate proper removal of the sulfate residue from such closed end tubes, it is preferable to carry out the chemical treatment in two repetitive cycles: both comprising the same series of steps except total contact time with the leachant is divided into separate portions for each cycle. For tubes 6 inches long and having an outside diameter of ¼ inch or ⅜ inch and an inside diameter of, respectively, 3/16 or 5/16 inch, it is preferred to employ gently boiling or agitated concentrated $H_2SO_4$ leachant (at about 300° C.) with its contact time on the first cycle being about two hours and on the second cycle being about one hour. Upon each removal of the closed end tubes for the leachant and from the HCl wash, it is desirable to shake out the liquid and loose solid residues from the tubes with their open ends held downward. Removal of sulfate residues can be facilitated by mechanically loosening them, including the employment of a stiff brush or pipe cleaner or of ultrasonic vibration of soaking wash solutions.

Although the preferred impervious stabilized zirconia for chemical treatment according to this invention in the production of oxygen sensors will have 8 wt.% $Y_2O_3$ as the stabilizer oxide, other stabilized zirconia compositions are suitable, viz. those consisting essentially of 4–15 mol% stabilizer oxide and 96–85 mol% $ZrO_2$.

I claim:

1. A method of chemically micropitting and/or microcratering a smooth surface of an impervious zirconia-base ceramic comprising
    contacting said smooth surface with a liquid leachant selected from concentrated sulfuric acid, ammonium bisulfate, alkali metal bisulfate and mixtures thereof at a temperature of at least about 250° C. and for a time sufficient to effect micropitting and/or microcratering generally uniformly distributed throughout the microstructure of the resultant leached surface,
    removing said leached surface from contact with said leachant,
    contacting said leached surface with hydrochloric acid to effect removal from said leached surface of a residue thereon comprising sulfate of metal elements including zirconium in said ceramic,
    removing said leached surface from contact with the hydrochloric acid, and
    rinsing said leached surface with water to effect removal of acid residue from that surface.

2. The method of claim 1 including agitating said leachant while contacting said surface.

3. The method of claim 1 including, upon removal from said leachant, rinsing the leached surface with water to effect removal of leachant residue from that surface.

4. The method of claim 1 including, upon removal from said leachant, mechanically removing part of the leachant and sulfate residues from the leached surface.

5. The method of claim 1 wherein the leachant is concentrated sulfuric acid.

6. The method of claim 5 wherein the temperature of the leachant is in the range of from 275° C. to the boiling point thereof and the time of contacting said surface with the leachant is in the range of from 0.5 to 5 hours.

7. The method of claim 1 wherein the leachant is a mixture of 5–25% by weight alkali metal bisulfate and the balance concentrated sulfuric acid.

8. The method of claim 7 wherein the alkali metal bisulfate is sodium bisulfate.

9. The method of claim 8 wherein the temperature of the leachant is in the range of from 275° C. to the boiling point thereof and the time of contacting said surface with the leachant is in the range of from 0.5 to 5 hours.

10. The method of claim 1 wherein the leachant is ammonium bisulfate.

11. The method of claim 1 wherein the leachant is alkali metal sulfate.

12. The method of claim 11 wherein the alkali metal sulfate is selected from sodium bisulfate and potassium bisulfate.

13. The method of claim 1 wherein the zirconia-base ceramic is a stabilized zirconia consisting essentially of 4–15 mol % stabilizer oxide and 96–85 mol % $ZrO_2$.

14. The method of claim 1 wherein the stabilizer oxide is selected from oxide of magnesium, calcium, yttrium and rare earth metal.

15. The method of claim 1 wherein the micropitting and microcratering respectively comprises micropits and microcraters individually having dimensions thereacross in the respective ranges of about 0.5–25 $\mu$m and 10–100 $\mu$m.

16. A method of improving adherence of a metal coating on an initially smooth surface of an impervious zirconia-base ceramic comprising
    contacting said smooth surface with a liquid leachant selected from concentrated sulfuric acid, ammonium bisulfate, alkali metal bisulfate and mixtures thereof at a temperature of at least about 250° C. and for a time sufficient to effect micropitting and/or microcratering generally uniformly distributed throughout the microstructure of the resultant leached surface,
    removing said leached surface from contact with said leachant,
    contacting said leached surface with hydrochloric acid to effect removal from said leached surface of a residue thereon comprising sulfate of metal elements including zirconium in said ceramic,
    removing said leached surface from contact with the hydrochloric acid,
    rinsing said leached surface with water to effect removal of acid residue from that surface,
    drying said leached surface, and
    forming a metal coating on said leached surface with the metal of said coating extending into the micropitting and/or microcratering of that surface.

17. The method of claim 13 wherein the stabilized zirconia contains less than 2 wt. % ordinary incidental impurities.

* * * * *

UNITED STATES PATENT AND TRADEMARK OFFICE
CERTIFICATE OF CORRECTION

PATENT NO. : 4,135,012
DATED : January 16, 1979
INVENTOR(S) : Yao-Sin Su

It is certified that error appears in the above-identified patent and that said Letters Patent are hereby corrected as shown below:

Column 2, lines 8-9, after the word each and before the word surface insert the word -- treated -- .

Signed and Sealed this

First Day of May 1979

[SEAL]

Attest:

RUTH C. MASON
Attesting Officer

DONALD W. BANNER
Commissioner of Patents and Trademarks